United States Patent [19]

Baggiani

[11] 4,124,772

[45] Nov. 7, 1978

[54] JUNCTION BETWEEN COAXIAL MAIN AND BRANCH TRANSMISSION LINES

[75] Inventor: Andrea Baggiani, Como, Italy

[73] Assignee: Societa Italiana Telecomunicazioni Siemens S.P.A., Milan, Italy

[21] Appl. No.: 830,332

[22] Filed: Sep. 2, 1977

[30] Foreign Application Priority Data

Sep. 3, 1976 [IT] Italy .............................. 26830 A/76

[51] Int. Cl.² ............................................. H01B 9/04
[52] U.S. Cl. ................................ 174/71 C; 174/75 C; 333/97 R
[58] Field of Search ................. 174/71 R, 71 C, 75 C, 174/88 C; 333/84 R, 84 M, 96, 97 R

[56] References Cited

U.S. PATENT DOCUMENTS 3,573,687  4/1971  Watanabe ...................... 333/84 R X
3,936,125  2/1976  Hutter ............................ 333/97 R X Primary Examiner—Thomas J. Kozma
Attorney, Agent, or Firm—Karl F. Ross

[57] ABSTRACT

A main transmission line with inner and outer metallic layers on a dielectric tube is joined to a coaxial branch line via a pin and a sleeve forming extensions of the inner and outer conductors of that branch line, the pin penetrating two diametrically opposite bores of the dielectric tube while the sleeve is in contact with the outer metallic layer. Two lugs on the sleeve are soldered to that outer layer whereas a connection between the inner layer and the pin is established via a conductive coating of the wall of the remote bore which terminates in a metallic patch surrounding the outer end of that bore, the patch being insulated from the outer layer of the tube and being soldered to the projecting tip of the pin.

6 Claims, 5 Drawing Figures

JUNCTION BETWEEN COAXIAL MAIN AND BRANCH TRANSMISSION LINES

FIELD OF THE INVENTION

My present invention relates to a telecommunication system with one or more coaxial branch lines joined to a main coaxial transmission line and, more particularly, to a junction between such a main line and a branch line.

BACKGROUND OF THE INVENTION

Transmission lines are known in which a tube of dielectric material has inner and outer metallic layers serving as the coaxial conductors thereof. In commonly owned U.S. Pat. No. 3,878,485, for example, there has been shown a transmission line of this description whose inner and outer layers are connected by soldering to respective leads of a two-wire branch line, one of these leads terminating in a plug traversing a peripheral bore in the dielectric tube.

In many instances, as in time-division-multiplex telephone (TDM) systems using pulse-amplitude modulation (PAM) to convey voice samples, parasitic storage of electrical energy in the transmission line causes objectionable cross-talk between adjacent time slots unless special measures, such as those described in the above-identified prior patent, are adopted. This calls for the use of coaxial conductors not only in the main transmission line but also in the associated branch lines.

OBJECTS OF THE INVENTION

The general object of my present invention, therefore, is to provide an electrically satisfactory and mechanically strong junction between such coaxial main and branch transmission lines.

A more particular object is to provide a junction of this character which allows all soldering operations to be performed at easily accessible external locations facilitating visual inspection of the resulting connections.

SUMMARY OF THE INVENTION

These objects are realized, in accordance with my present invention, by providing the inner and outer conductors of the coaxial branch line with extensions in the form of a pin and a sleeve, respectively, the pin projecting beyond the sleeve by a distance at least equal to the diameter of the dielectric tube of the main line so as to penetrate completely a transverse perforation of that tube which includes two aligned bores, namely a first bore proximal to the sleeve and a second bore remote from the sleeve when the branch line is attached to the main line. The sleeve, contacting the outer layer of the tube, is soldered to that layer in a region which surrounds the first bore, preferably at two or more points peripherally equispaced about the axis of the branch line; in a particularly advantageous embodiment, affording high structural stability, the sleeve has two laterally projecting lugs lying in a common axial plane of the two lines received in respective recesses of the tube surface, the soldering connection between the sleeve and the outer layer being made at these lugs. The inner layer is integral or at least electrically continuous with a metallic coating on the wall of the second bore, that coating terminating in a metallic patch on an area of the outer tube surface where the outer layer is omitted; within that discontinuity of the outer layer, the tip of the pin emerging from the second bore is soldered to the surrounding patch.

In order to obviate the need for clearing a portion of the not easily accessible inner layer from the vicinity of the inner end of the first bore, that bore is advantageously made so large as to be traversed by the pin with enough clearance to prevent possible contact between the pin and the inner layer. If desired, the second bore could have a smaller diameter so as to surround the pin with little or no clearance.

BRIEF DESCRIPTION OF THE DRAWING

The above and other features of my invention will now be described in detail with reference to the accompanying drawing in which.

SPECIFIC DESCRIPTION

Figure 1:
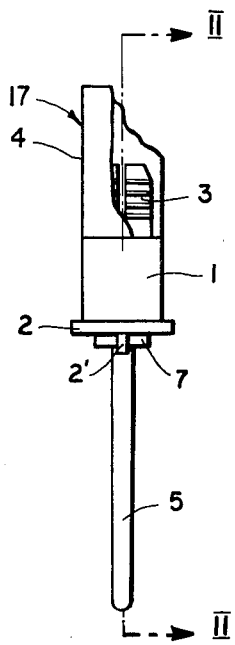
FIG. 1 is a side-elevational view, partly broken away, of a branch connector for a coaxial-line junction according to my invention.
Figure 2:
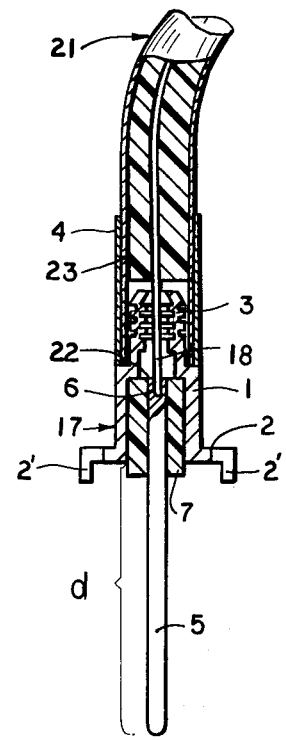
FIG. 2 is an axial sectional view taken on the line II—II of FIG. 1, showing part of a coaxial cable inserted into one end of the connector.
Figure 3:
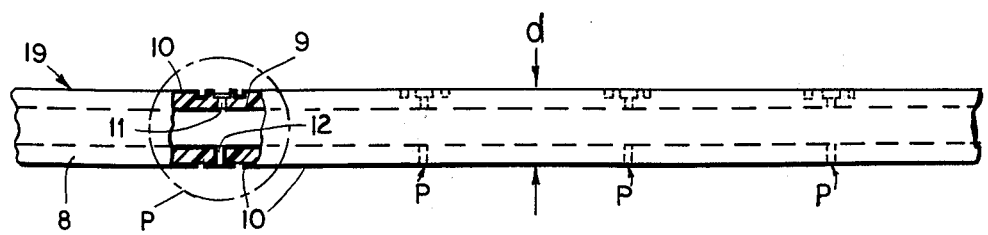
FIG. 3 is a side-elevational view of a main coaxial transmission line, drawn to a reduced scale and shown partly in section, adapted to be joined to a plurality of branch lines such as the cable of FIG. 2.

In FIGS. 1 and 2 I have shown a connector 17 designed to join a coaxial cable 21, FIG. 2, to a main transmission line 19, FIG. 3, at any one of several branching points P. Connector 17 comprises a metallic sleeve 1 which is centered on a metal pin 5 and electrically separated therefrom by an insulating bushing 7. The tip of pin 5 projects beyond the sleeve 1 by a distance $d$ substantially corresponding to the diameter of line 19.

Pin 5 has a socket 6 receiving the inner conductor 18 of cable 17 which is soldered to it at 22. Sleeve 1 is integral with a corrugated nipple 3 firmly embraced by the outer conductor 23 of the cable, a ferrule 4 serving to hold that conductor in place. At its opposite end, sleeve 1 is integral with a flange 2 forming two diametrically opposite lugs 2'.

Figure 4:
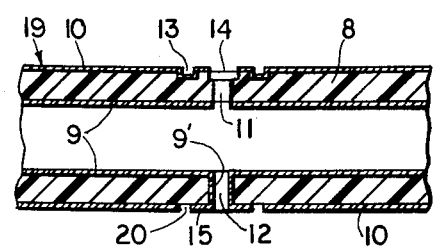
FIG. 4 is a fragmentary sectional view of the main line of FIG. 3, drawn to a somewhat larger scale.

Transmission line 19 comprises a rigid dielectric tube 8, e.g. of polytetrafluoroethylene (Teflon), coated internally and externally with respective metallic layers 9 and 10. At each branching point P, as more fully illustrated in FIG. 4, tube 8 is provided with a pair of aligned radial bores 11 and 12 on opposite sides of the tube axis. The first bore 11 is surrounded by a shallow depression 14 designed to receive an extremity of bushing 7 (FIG. 2) projecting beyond flange 2; two slightly deeper recesses 13 are provided in the outer tube surface on opposite sides of bore 11, within an axial plane of tube 8 bisecting the bores 11 and 12. The outer conductor layer 10 extends into the recesses 13 but not into the depression 14.

Figure 5:
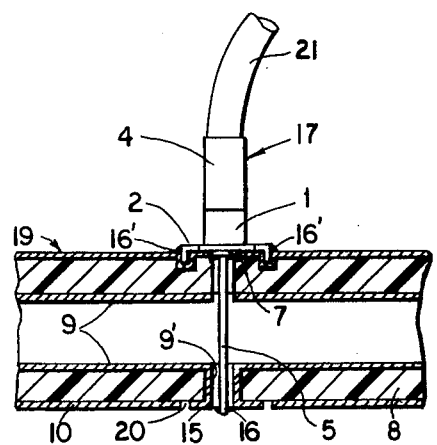
FIG. 5 is a view similar to FIG. 4, illustrating the connection between that main line and the branch connector of FIGS. 1 and 2.

The inner conductor layer 9 is integral with a metallic coating 9' which lines the wall of bore 12 and terminates in an annular metallic patch 15 surrounding the outer end of bore 12, that patch lying in an uncoated area 20 of the outer tube surface. Upon the assembly of connector 17 with tube 8, as illustrated in FIG. 5, pin 5 is passed through the transverse tube perforation consisting of bores 11 and 12 until its tip emerges from the latter bore, in order to be soldered to the patch 15 as shown at 16. The lugs 2' of sleeve 1, received in recesses 13, are soldered to layer 10 as indicated at 16' whereby the electrical connection between main line 19 and branch line 21 is completed.

It will be noted that pin 5 has a diameter smaller than that of bores 11 and 12 so as to pass through both these bores with all-around clearance. That clearance is essential in the case of proximal bore 11, in order to prevent a short-circuiting of line conductors 9 and 10, but is optional in the case of remote bore 12. Even in the absence of a tight fit of pin 5 in bore 12, the mating engagement of sleeve 7 and lugs 2' with depression 14 and recesses 13 ensures a firm seating of the connector on the transmission line 19.

I claim:

1. In a telecommunication system including a main transmission line conductively connected to a coaxial branch line, said main line comprising a dielectric tube provided with an inner metallic layer and an outer metallic layer, said branch line including an inner conductor and an outer conductor, the improvement wherein said branch line is provided with a conductive sleeve forming an extension of said outer conductor and with a conductive pin forming an extension of said inner conductor, said pin projecting beyond said sleeve by a distance at least equal to the diameter of said tube, said pin penetrating a transverse perforation of said tube constituted by a first bore proximal to said sleeve and a second bore remote from said sleeve, the wall of said second bore being provided with a metallic coating which is electrically continuous with said inner layer and terminates in a matallic patch on the outer surface of said tube within a discontinuity of said outer layer, said sleeve being soldered to said outer layer in a region surrounding said first bore, said pin being soldered to said patch at the outer end of said second bore.

2. The improvement defined in claim 1 wherein said sleeve is provided with a plurality of laterally projecting lugs received in recesses of said outer surface, said sleeve being soldered to said outer layer at said lugs.

3. The improvement defined in claim 2 wherein said lugs lie on opposite sides of said first bore in a common axial plane of said main and branch lines.

4. The improvement defined in claim 1 wherein said outer surface is provided with a depression surrounding the outer end of said first bore, further comprising an insulating bushing interposed between said sleeve and said pin, said bushing having an extremity received in said depression.

5. The improvement defined in claim 4 wherein said depression is free from said outer layer.

6. The improvement defined in claim 1 wherein said pin traverses said first bore with clearance.

* * * * *